(12) United States Patent
Isoda et al.

(10) Patent No.: US 7,048,670 B2
(45) Date of Patent: *May 23, 2006

(54) ENGINE CONTROL METHOD AND DEVICE FOR A VEHICLE

(75) Inventors: Naoyo Isoda, Shuuchi-gun (JP); Masahiko Enoyoshi, Shuuchi-gun (JP)

(73) Assignee: Kabushiki Kaisha Moric, Mori-machi (JP)

(*) Notice: Subject to any disclaimer, the term of this patent is extended or adjusted under 35 U.S.C. 154(b) by 208 days.

This patent is subject to a terminal disclaimer.

(21) Appl. No.: 10/064,508

(22) Filed: Jul. 23, 2002

(65) Prior Publication Data
US 2003/0033076 A1 Feb. 13, 2003

(30) Foreign Application Priority Data
Aug. 10, 2001 (JP) .............................. 2001-243783

(51) Int. Cl.
*B60K 41/04* (2006.01)
*F02P 5/00* (2006.01)

(52) U.S. Cl. .................. 477/107; 477/111; 123/406.24; 701/54

(58) Field of Classification Search ................ 477/107, 477/108, 110, 111; 123/406.24, 436; 701/53, 701/54
See application file for complete search history.

(56) References Cited

U.S. PATENT DOCUMENTS

| | | | |
|---|---|---|---|
| 4,986,401 A * | 1/1991 | Petzold et al. | 477/176 |
| 5,086,741 A * | 2/1992 | Nakamura et al. | 123/406.2 |
| 5,103,399 A * | 4/1992 | Iwata et al. | 701/85 |
| 5,233,530 A * | 8/1993 | Shimada et al. | 701/107 |
| 5,305,662 A * | 4/1994 | Togai et al. | 477/43 |
| 5,559,703 A * | 9/1996 | Iwata et al. | 701/86 |
| 5,597,371 A * | 1/1997 | Toukura | 477/111 |
| 5,681,239 A * | 10/1997 | Toukura | 477/107 |
| 5,970,951 A * | 10/1999 | Ito | 123/335 |
| 6,024,674 A * | 2/2000 | Sato et al. | 477/175 |
| 6,308,128 B1 * | 10/2001 | Nishijima et al. | 701/93 |
| 6,343,586 B1 * | 2/2002 | Muto et al. | 123/406.25 |
| 6,389,347 B1 * | 5/2002 | Nozaki | 701/54 |
| 2003/0029419 A1* | 2/2003 | Isoda et al. | |

FOREIGN PATENT DOCUMENTS

| | | | |
|---|---|---|---|
| JP | 02030934 A | * | 2/1990 |
| JP | 11287140 A | * | 10/1999 |
| JP | 11325186 A | * | 11/1999 |

* cited by examiner

*Primary Examiner*—Tisha Lewis
(74) *Attorney, Agent, or Firm*—Ernest A. Beutler (57) ABSTRACT

An engine speed control that avoid undesirable transmission conditions such as clutch chattering. This is done by sensing actual conditions, which are likely to result in the undesirable transmission conditions such as clutch chattering and only changing the engine output when these exact conditions are found. The conditions sensed are the determination of excessive acceleration in engine speed or in the speed of a shaft associated with the engine or the degree of rotational variation or rotational acceleration.

20 Claims, 7 Drawing Sheets

ENGINE CONTROL METHOD AND DEVICE FOR A VEHICLE

BACKGROUND OF INVENTION

This invention relates to an engine control method and engine control structure for a vehicle and more particularly to an improved engine control that prevents unwanted transmission action such as clutch chatter.

In small vehicles such as scooters, engine revolution is often transmitted to the driven wheel through an automatic transmission. Vehicles with belt type continuously variable transmissions have been widely in use. In such cases, the transmission system is typically provided with a starting centrifugal friction clutch. The centrifugal friction clutch becomes engaged through centrifugal force when the rotational speed rises close to a predetermined value and the friction force increases as the rotational speed rises. This enables a smooth start of the vehicle.

However, in the friction clutch, a chattering phenomenon caused by vibrations or oscillation may happen during the engagement of the clutch. If this phenomenon happens, not only may the clutch and the transmission system be damaged, but the rider and passengers may experience an uncomfortable feeling. To avoid or minimize these effects the size and material of the clutch have been improved at some cost disadvantage.

As a further or substitute remedy, the engine power is reduced by a given amount in a predetermined speed range near the engine speed at which the clutch is connected. One way this has been done is to retard ignition timing to lower engine output so that vibrations are restricted during clutch connection. Alternatively this may be done by skipping or misfiring of the spark plug. In such methods, the delayed angle or skipping is set to a fixed value.

However, the juddering phenomenon doesn't always occur. The occurrence depends on running conditions such as load on the vehicle; wear conditions of the friction members of the clutch, or other factors. In such cases, there is no need of reducing engine power, but the previous systems do so a predetermined speed range at all times. Therefore not only is engine combustion impaired with decreased fuel efficiency, but also undesirable exhaust emissions are increased.

Thus, it is a principle object of this invention to provide an improved engine control method and system for a vehicle capable of preventing the generation of transmission vibrations particularly caused by connection and disconnection of a clutch.

SUMMARY OF INVENTION

A first feature of this invention is adapted to be embodied in an engine control method for a vehicle in which rotation of an internal combustion engine shaft is transmitted to a driven wheel through a transmission. The method comprises the steps of detecting variations in the rotational state of the shaft during engine acceleration, determining if the degree of rotational variation is likely to cause vibrations from occurring in the transmission, and restricting engine output if the rotational state of the shaft is excessive.

Another feature of the invention is adapted to be embodied in a vehicle engine control. The vehicle has an internal combustion engine, a driven wheel and a transmission for driving the driven wheel from a shaft of the internal combustion engine. An engine control detects variations in the rotational state of the shaft during engine acceleration. If the engine control determines the degree of rotational variation is excessive, the engine output is reduced to avoid vibrations from occurring in the transmission.

DETAILED DESCRIPTION

Figure 1:
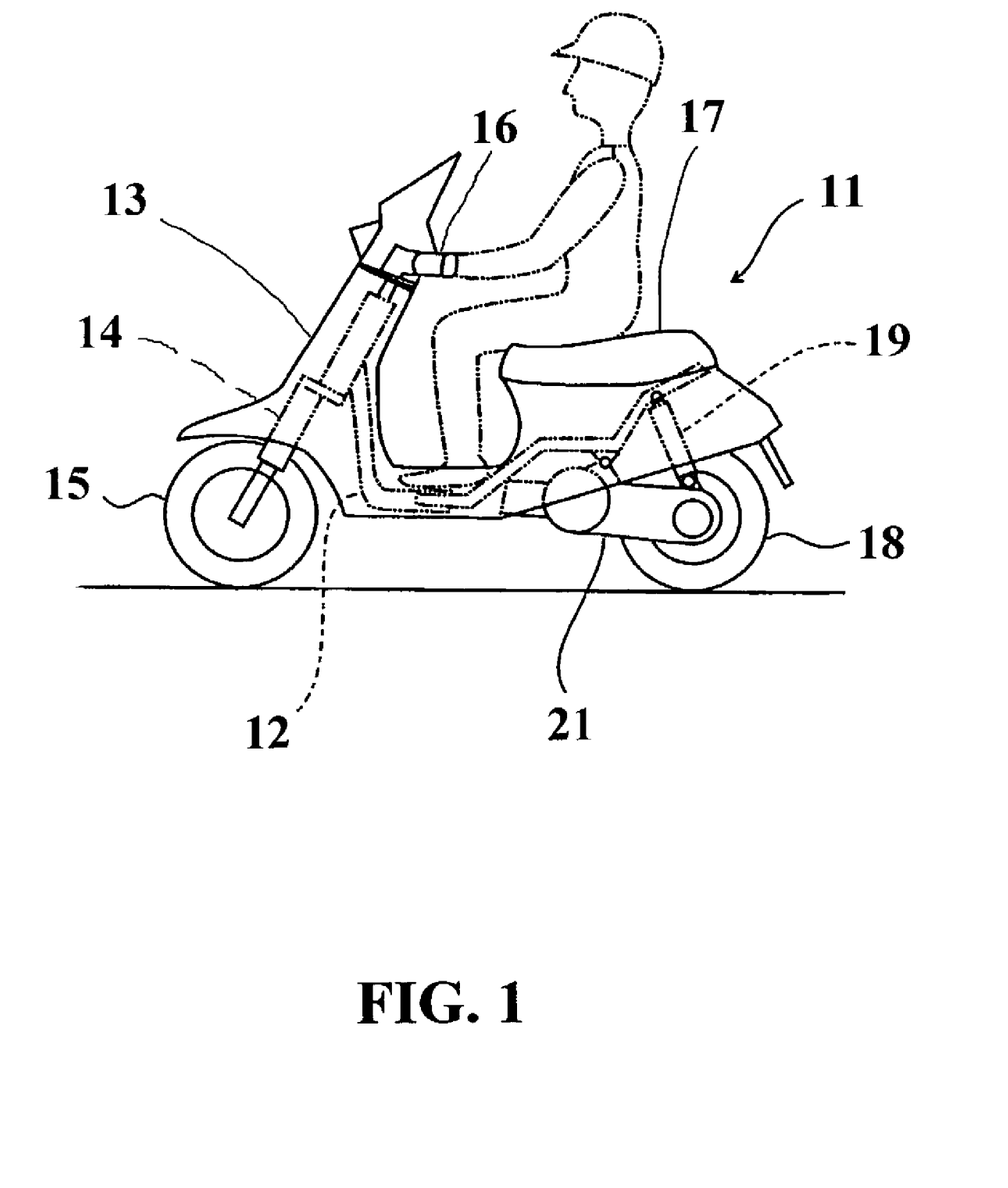
FIG. 1 is a side elevational view of a small vehicle having an engine control and system for preventing undesirable transmission conditions.

Referring now in detail to the drawings and first to FIG. 1, a small type of vehicle with which the invention has particular utility is indicated generally by the reference numeral 11. Although, this vehicle 11 is a motor scooter, it will be apparent to those skilled in the art how the invention can be utilized with other types of vehicles. The motor scooter has a frame 12 on which a body assembly 13 is mounted in a suitable manner. The frame 12 journals a front fork 14, which, in turn, rotatably supports a dirigible front wheel 15. A handlebar assembly 16 at the upper end of the front fork 14 can be steered by a rider seated on a seat 17 of the body assembly 13.

A driven rear wheel 18 is positioned beneath the seat and is suspended by the frame 12 via a suspension element 19. The rear wheel 18 is driven by a combined engine transmission assembly, indicated generally by the reference numeral 21. The engine transmission assembly 21 will now be described by principal reference to FIG. 2.

Figure 2:
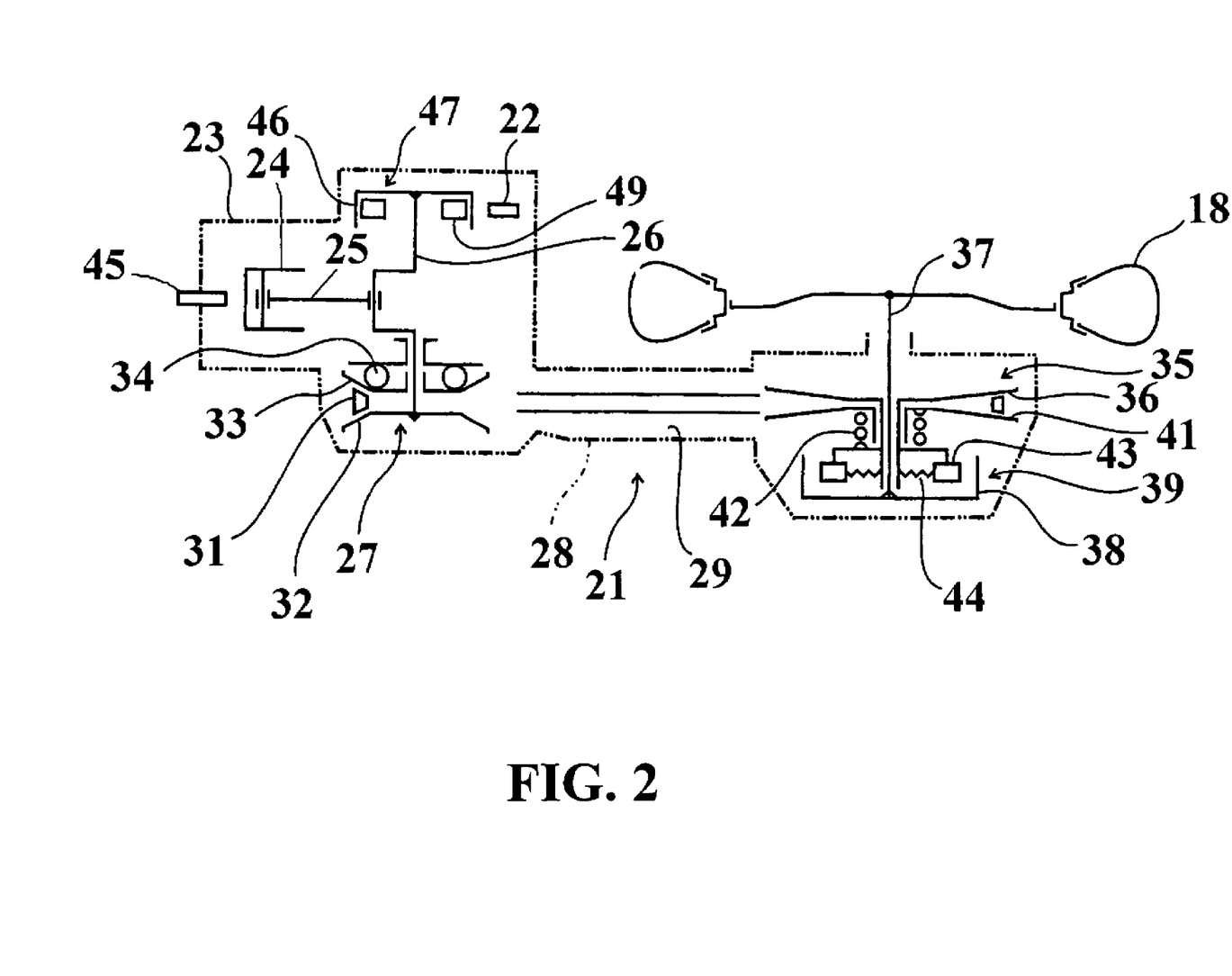
FIG. 2 is a partially schematic cross sectional view of the engine, transmission system and driven wheel of the vehicle.

The engine transmission assembly 21 includes an internal combustion engine, shown partially in section and identified generally by the reference numeral 22. This engine may have any number of cylinders and may operate on any principal i.e. either two stroke or four stroke or be of the rotary type. Therefore, the engine components will be described only generally and these include a cylinder block 23 that defines a cylinder bore in which a piston 24 reciprocates. A connecting rod 25 connects the piston 14 to a throw of a crankshaft 26 that is journalled in a suitable manner in the crankcase assembly of the engine 22.

The crankshaft 26 is coupled to the input shaft of a continuously variable belt type transmission, indicated generally by the reference numeral 27, and which extends in part through an elongated casing 28 which defines a clearance opening 29 for a drive belt 31. The driving pulley for the drive belt 31 comprises a first pulley half 32 that is fixed for rotation with the crankshaft 26. A second, axially moveable pulley half 33 cooperates with flywheel weights 34 to increase the effective diameter of the driving pulley as the engine speed increases.

Referring now to the right hand side of FIG. 2 that shows how the drive is transmitted from the belt 31 to the rear wheel, a driven pulley assembly, indicated generally by the reference numeral 35, is associated with the wheel 18. The driven pulley 35 includes an axially fixed sheave portion 36 that is fixed for rotation with an axle 37 that drives the wheel 18. Also affixed thereto is the drum 38 of a centrifugal clutch, indicated generally by the reference numeral 39.

The driven pulley 35 further includes an axially moveable sheave 41, which is loaded by a spring 42 so as to normally urge the sheave halves together to increase the effective diameter of the driven pulley 35. However, when the driving pulley 27 is in a condition of minimum diameter, the diameter of the driven pulley 35 will be at its maximum to provide a lower transmission ratio.

The centrifugal clutch 39 includes a plurality of clutch elements that are pivotally supported and have frictional faces. These elements are indicated by the reference numeral 43. These elements are normally urged inwardly by coil compression springs 44 so as to hold them out of engagement with the inner surface of the drum 38.

In this condition, the system will operate in neutral. That is, the clutch 39 is disengaged. As the engine speed increases, however, the centrifugal force on the clutch shoes 43 will overcome the action of the springs 44 and the clutch will engage so as to transmit drive to the driven wheel 18.

As the engine speed continues to increase, the diameter of the driving pulley 27 will increase and the effective diameter of the driven pulley 35 will decrease so as to increase the speed at which the wheel 18 is driven relative to the crankshaft 26. As thus far described, the construction may be considered to be conventional.

As should be apparent from the foregoing description, the invention relates to a system for controlling the power generated by the engine 22 under certain running conditions so as to void chattering when the centrifugal clutch 39 is engaged. The specific embodiment illustrated, achieves this by controlling the firing of the ignition system of the engine 22. To this end, the engine 22 is provided with one or more spark plugs 45 associated with each of its cylinders. These spark plugs 45 are fired by an ignition system and the control system for controlling the firing of the spark plug 45 will be described in more detail.

The crankshaft 26 engine 22 is affixed to a flywheel 46 in a known manner. Although the invention is depicted in association with a crankshaft positioned sensor, it may be associated with any other shaft that is driven by the engine in timed relation. The flywheel 46 may also function as a permanent magnet AC generator indicated generally at 47. This includes permanent magnets 48 fixed to its inner surface that cooperate with coils (not shown) in a manner well known in the art.

For ignition timing control, a pulser type sensor 49 (FIGS. 2–5) is associated with the flywheel 46 and specifically with a timing mark 51 affixed to its outer peripheral surface. The timing mark 51 has a leading edge 52 and a trailing edge 53 which, when passing the sensor 49 will output pulses that can be measured so as to measure the time it takes the timing mark 51 to pass the sensor 49. This constitutes an instantaneous rotational speed for the engine 22 during a portion of a complete rotation.

Figure 4:
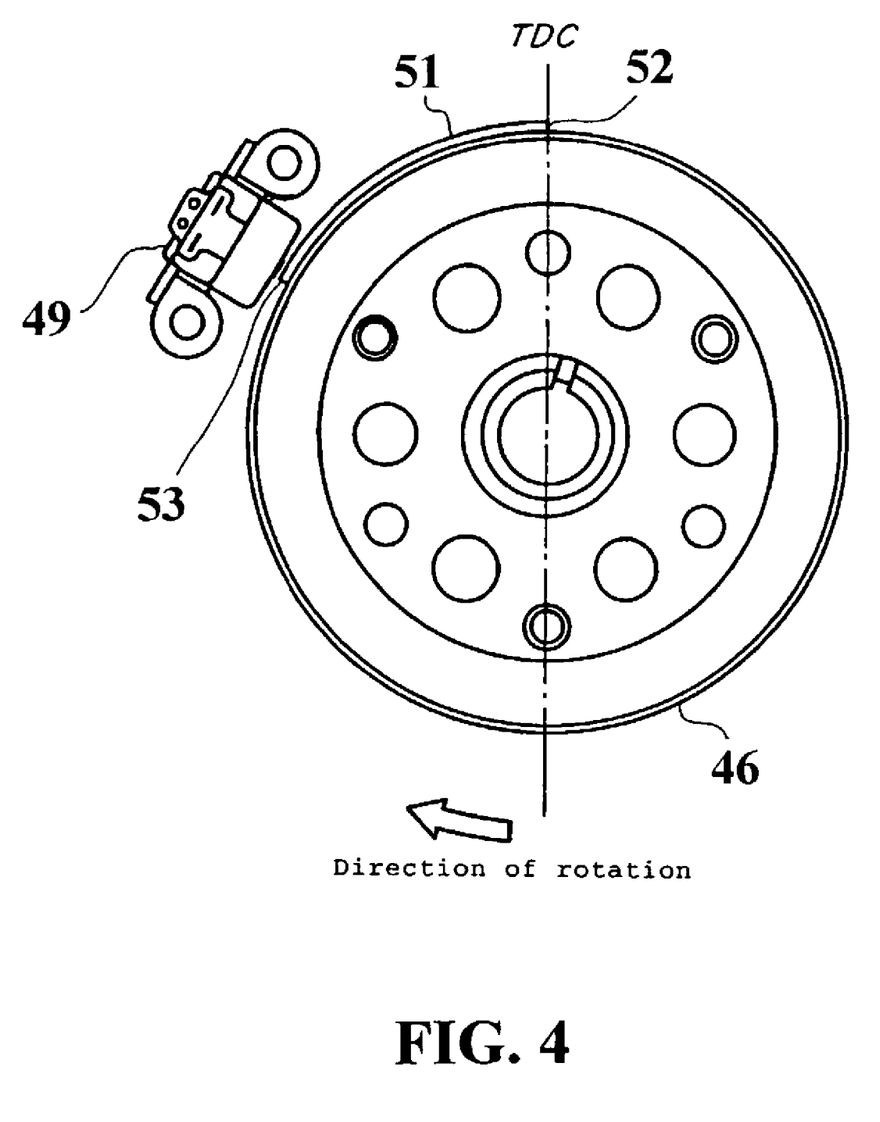
FIG. 4 is a side elevational view showing the timing sensor associated with the engine shaft for the control system.

The timing mark 51 is considerably wider, in accordance with the invention, than those normally used. Such widening is not necessarily required, but can improve the control. For example the width of the mark 51 be equal to 60° of crankshaft rotation. The timing mark is set so that it will first trigger a pulse as the engine begins to approach top dead center (TDC) position and another pulse after the crankshaft is at or near top dead center. The specific angles may vary depending upon the particular application.

Nevertheless, if the engine 22 operates on a four-stroke operation, these pulses are generated at the end of the compression and exhaust strokes. Prior art methods may have utilized speed measurements at the power stroke, but it has been found that the compression and exhaust stroke are much more accurate in providing an indication of engine load and this constitutes one of the features of the invention.

With a two cycle engine the two measurements per revolution will provide adequate information for engine control on the next revolution.

Figure 3:
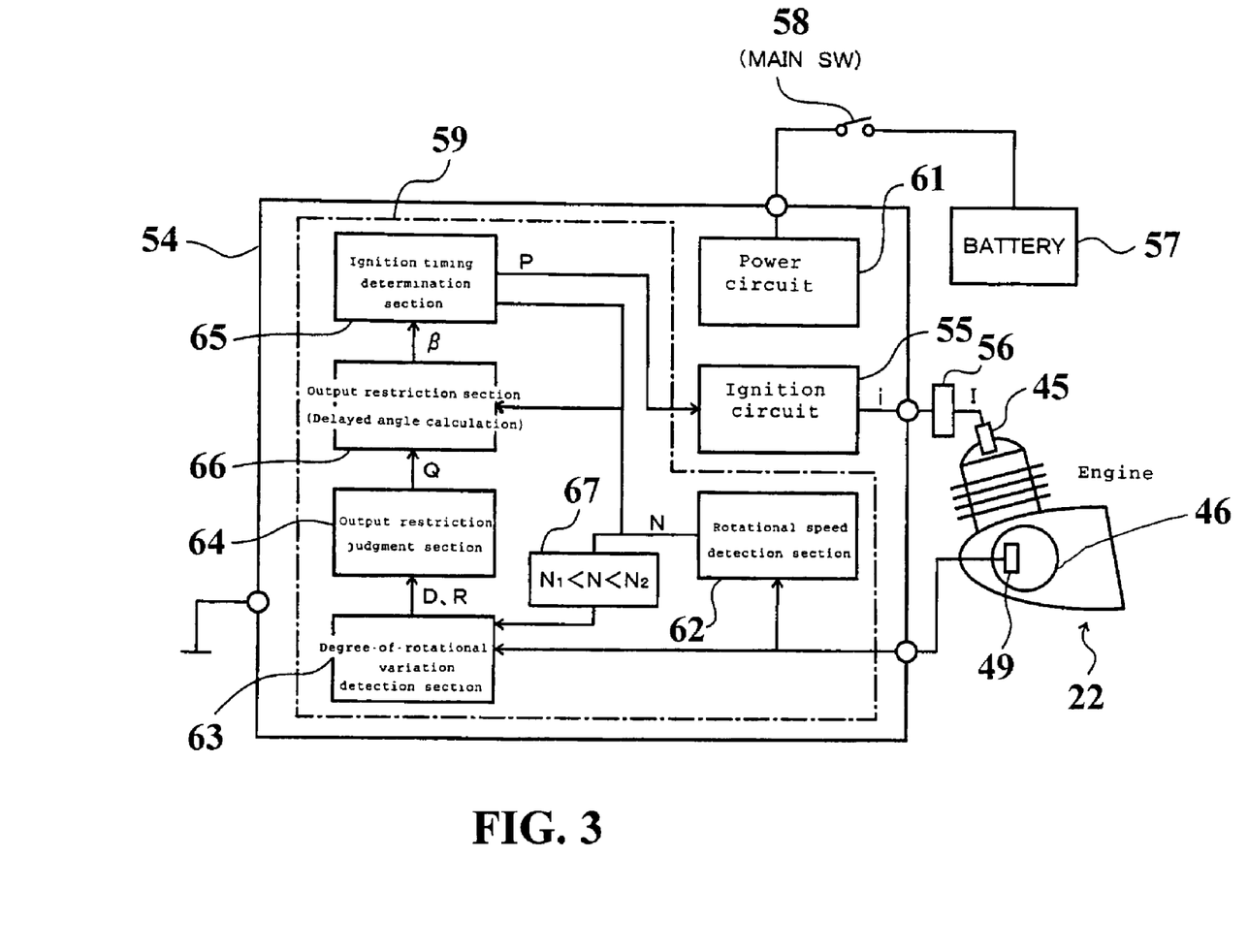
FIG. 3 is a schematic view of an engine control constructed and operated in accordance with an embodiment of the invention.

As seen in FIG. 3, the output from the sensor 49 is delivered to an engine system ignition timing control device 54, which contains an ignition circuit 55 which can be basically a conventional ignition circuit of the CDI type, which outputs a signal, "i" to a coil 56 that outputs a pulse "I" for firing the spark plug 45 in a known manner.

This engine timing control device 54 is powered with electrical power from a battery 57 through a main switch 58. The ignition timing control device 54 includes an electronic circuit 59 constituted by a microcomputer or the like, and the ignition circuit 55 consisting of a CDI (capacitor discharging ignition circuit), and a power circuit 61. The power circuit 61 is formed by a constant voltage circuit for outputting power source voltages for the ignition circuit 55 and the electronic circuit 59.

The output from the sensor 49 is transmitted to a rotational speed detection section 62 of the engine system ignition timing control device 54 and specifically the electronic circuit 59, which outputs a signal N indicative of the rotational speed of the engine 22 during each complete revolution cycle. In addition, the outputs from the leading and trailing edges 52 and 53 of the timing mark 51 registered on the sensor 49 are transmitted to a degree of rotational variation detection section 63. This rotational variation detection section 63 outputs a signal indicative of the speed difference to an output restriction judgment section 64.

In the described embodiment, the flywheel 46 may be formed of a magnetic material, and the sensor or coil 49 faces the rotational locus of the timing mark 51. In this case, opposite ends of the timing mark 51 are detected from changes in magnetic resistance in the magnetic path passing through the iron core of the coil 49. Alternatively the timing mark 51 may be formed from permanent magnets fixed on the flywheel 46 at positions a given angle away from each other, and the sensor may be a magnetic sensor such as a Hall element for detecting passage of the permanent magnets. Alternatively, the mark may be a slit, which may be detected optically with an LED and a light receiving element.

As seen in FIG. 3, the electronic circuit 59 comprises the rotational speed detection section 62, the degree-of-rotational variation detection section 63 and the output restriction judgment section 64, as already noted. The electronic circuit 59 further comprises an ignition timing determination section 65, an output restriction section 66 and other components, some of which will be described. At least one of these circuits 62, 63–66 can be formed by the software of a microcomputer.

The output signal of the sensor 49, that is, the positive or negative pulse outputted after detection of the forward and rearward ends 52, 53 of the projection 51, is inputted into the rotational speed detection section 62, where a rotational speed N (rpm) is determined from the time interval between successive two positive pulses or two negative pulses. The output pulse of the sensor 49 is inputted into the degree-of-rotational variation detection circuit 63, where the degree of rotational variation R is determined.

Figure 5:
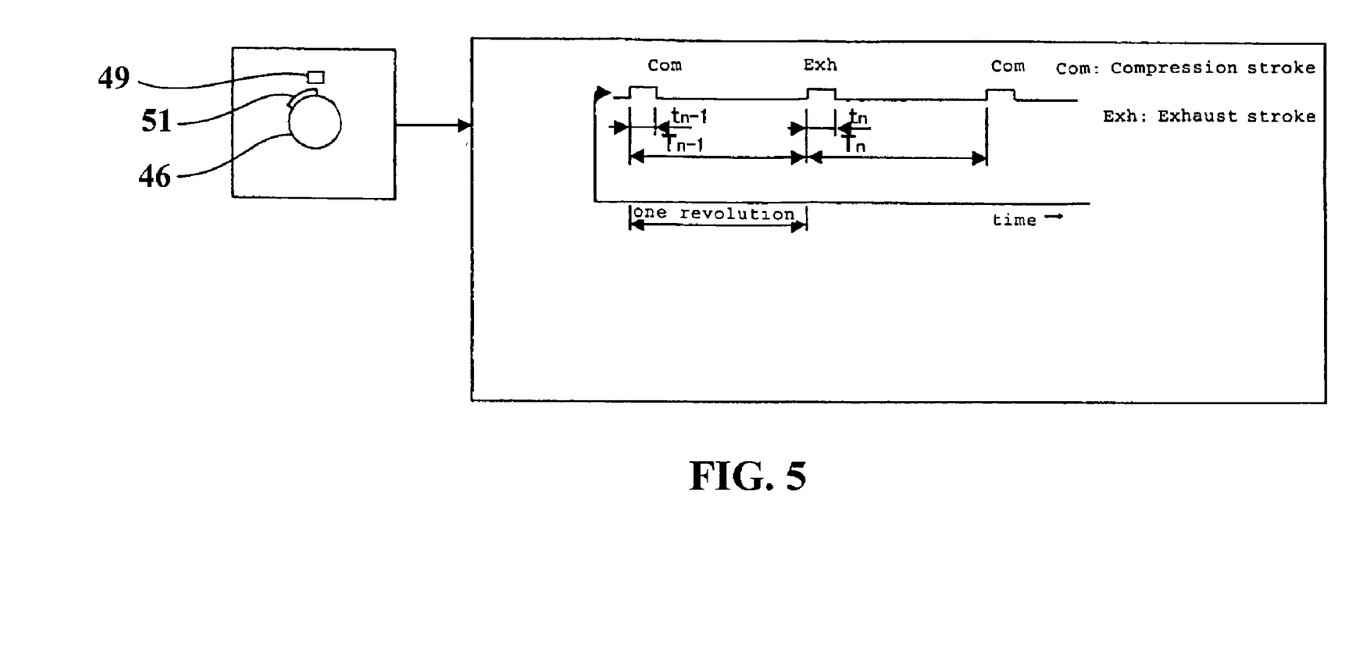
FIG. 5 is a schematic view showing the method of determining shaft acceleration in accordance with the invention.

A manner in which the degree of rotational variation can be obtained will now be described by reference to FIG. 5. The degree-of-rotational variation detection section 63 measures the time interval "D" from the forward end 52 to the rear end 53 of the projection 51 as being tn−1 for the compression stroke and tn for the subsequent exhaust stroke. Also determined is a length of time "T" for the crankshaft 16 to makes one revolution by measuring the time interval between successive positive (or negative) pulses. Here, the period on the compression stroke is represented by Tn−1, and the period on the exhaust stroke by Tn.

A first method of determining the degree of rotational variation R is one in which a ratio t/T of detection time t of the projection to the period T is determined, and the ratio (t/T)=R represents the degree of rotational variation. A second method of determining the degree of rotational variation R is one in which ratios (t/T) obtained by the first method are determined for the compression stroke and the exhaust stroke, and the difference between them represents the degree of rotational variation. That is, a difference (Rn−1−Rn)=D between a ratio (tn−1/Tn−1)=Rn−1 on the compression stroke and a ratio (tn/Tn)=Rn on the exhaust stroke is determined for each compression or exhaust stroke.

The output restriction judgment section 64 compares the degree of rotational variation R (or D) obtained in the degree-of-rotational variation detection section 63, with a set value stored in advance. If R (or D) exceeds the set value, an output restriction signal Q is outputted. The output restriction section 66 controls the engine to restrict its output, based on the output restriction signal Q. In this embodiment, since ignition timing is delayed to restrict engine output, delayed angle β is calculated.

The delayed angle β may be a fixed value or a variable related to the operating conditions such as rotational speed N or some other running condition. For example, the delayed angle β is increased during high speed rotation, and decreased during low speed rotation. The ignition timing determination section 65 determines an ignition timing α at the time of normal operation, subtracts the delayed angle β to obtain (α−β), and outputs an ignition signal P with (α−β) as an ignition timing. The ignition circuit 55 generates ignition sparks based on the ignition signal P at the ignition plug 45.

The ignition timing determination section 65 may determine the ignition timing α based on rotational speed N or on a combination of rotational speed and load from a map. The load may be obtained from the amount of rotational movement of a throttle control (lever), that is, throttle valve opening, or based on the degree of rotational variation R (or D).

Figure 6:
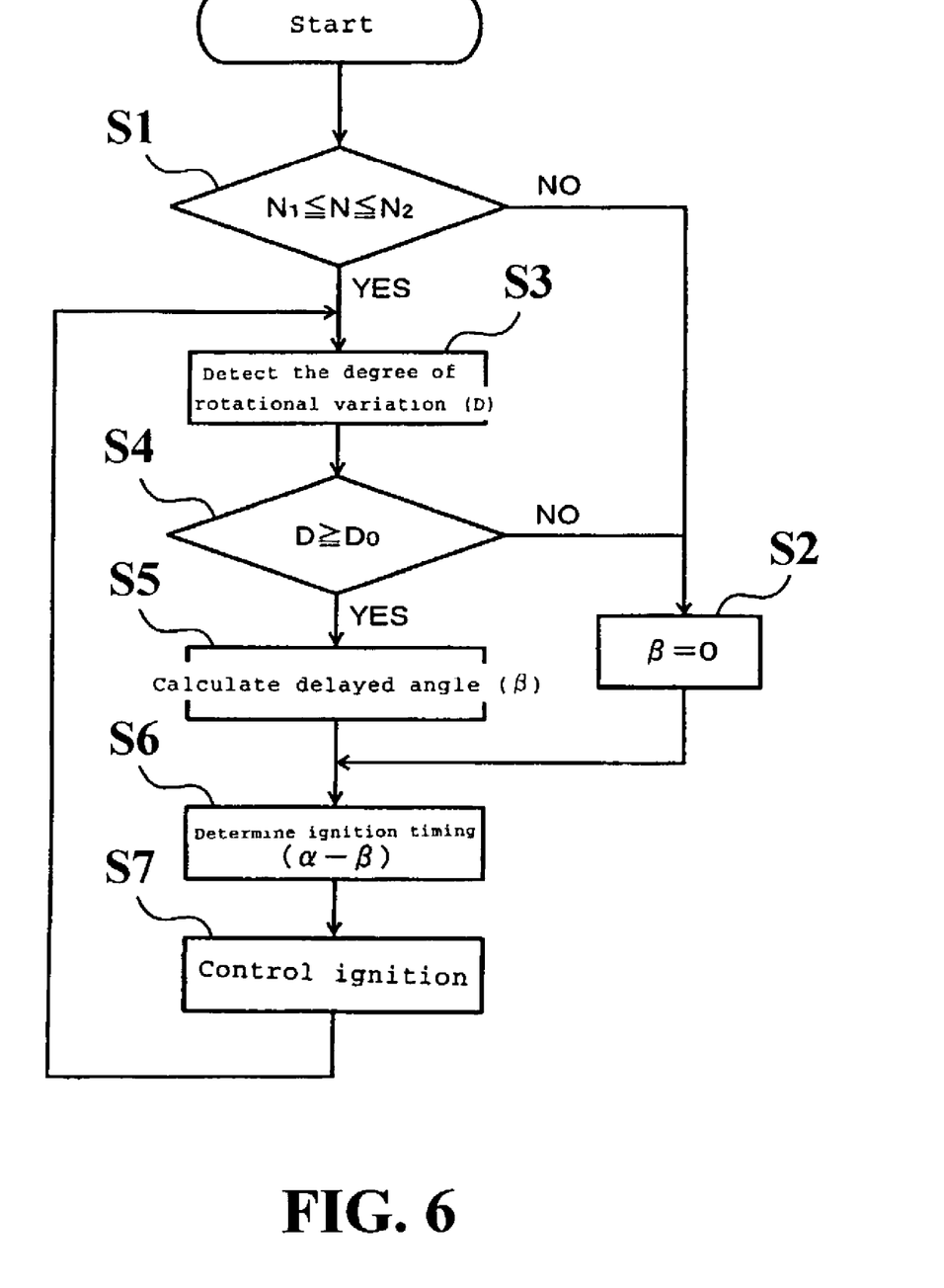
FIG. 6 is a block diagram showing a control routine, which may be utilized to practice the invention.

The control routine of this embodiment will generally be described with reference to FIG. 6. First, at the step S1 the rotational speed detection section outputs a signal indicative of instantaneous engine speed to a clutch operating range section of the circuit 59. This section determines if the engine speed is in the range when the centrifugal clutch 39 will engage or disengage. This is shown as step S1 in FIG. 6 where it is determined if the speed is in the range $N_1$ to $N_2$. If it is not in this range protective action is not required and the program moves to the step S2 where tie timing adjustment angle β is set to zero and normal ignition timing will result.

If the engine speed is in the range where engagement of the centrifugal clutch 39 may change, the program moves to the step S3 where the circuit degree-of-rotational variation detection circuit 63 detects a degree-of-rotational variation, either D or R as noted above. Then at the step S4 the output restriction judgment section 64 of the electronic circuit 59 compares this degree of variation D with a set value D0. If D−D0, the output restriction signal Q is not outputted. Thus at the step S2 the output control section 66 sets the delayed angle β to zero.

If D is not less than D0, the output restriction signal Q is outputted and at the step S5 the output restriction section 66 calculates a delayed angle β. Then at the step S6 the ignition timing determination circuit 65 determines an ignition timing (α−β) using this delayed angle and the rotational speed N. The circuit sends an ignition signal P corresponding to the ignition timing (α−β) to generated ignition sparks at the ignition plug 45 at the step S7. The program then repeats until D is less than D0.

The rotational acceleration N'0 (angular acceleration ω') at the time when the degree of rotational variation D (or R) coincides with a set value D0, is stored in a memory, and thereafter, the delayed angle β is feedback controlled such that the rotational acceleration N'0 (ω'0) is constant. Thus, the acceleration is constant during accelerating operation, so that a smooth acceleration feeling and lack of clutch chattering can be achieved.

Figure 7:
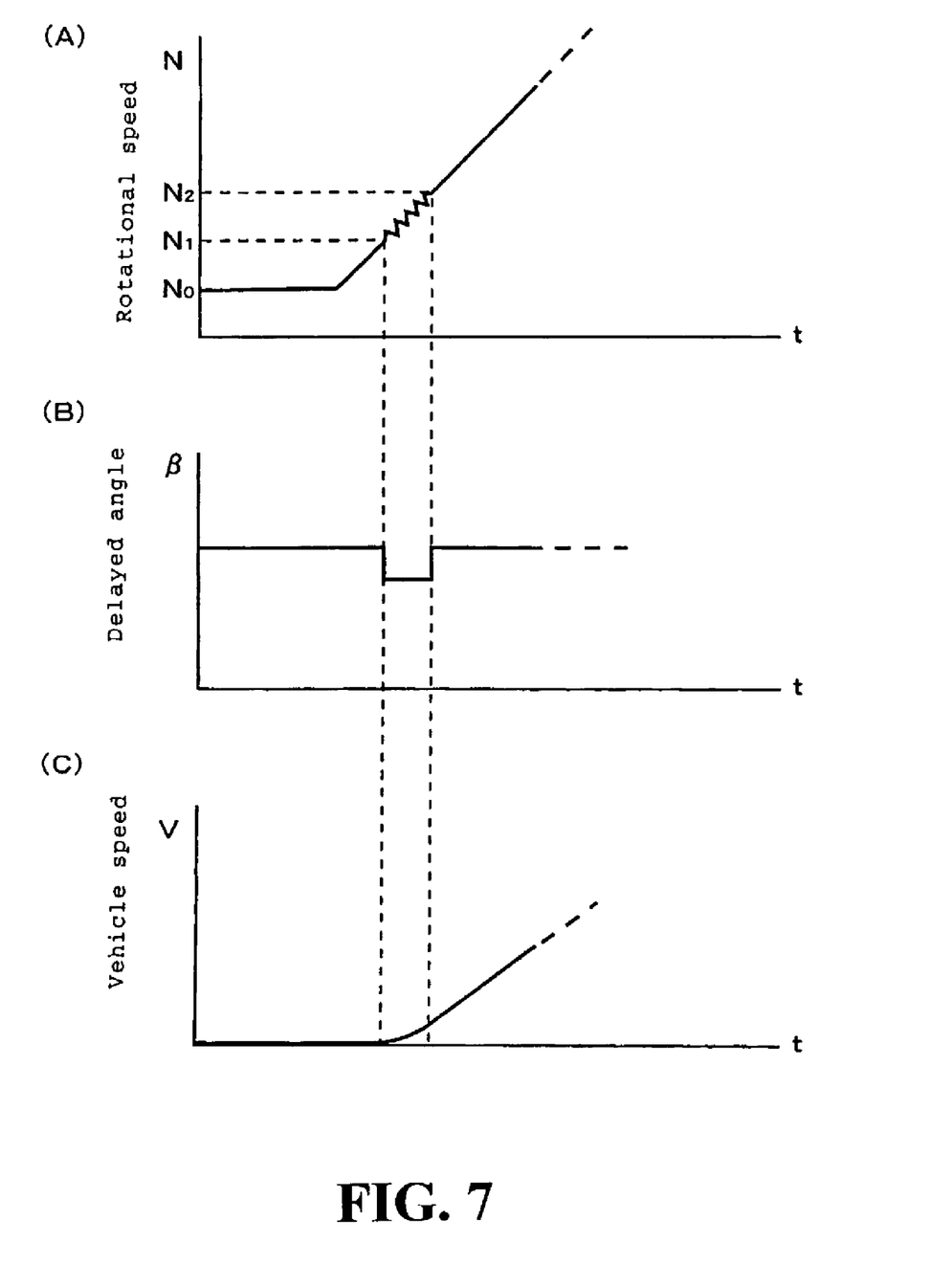
FIG. 7 is a graphical view showing shaft speed (A), spark timing (B) and vehicle speed (C) with respect to time during initial vehicle start up under a condition when the engine is controlled to avoid undesirable transmission system vibrations and/or clutch chattering.

This result can be seen by reference to FIG. 7 which is a graphical view showing rotational speed variations, spark timing and vehicle speed in accordance with the invention in relation to time. It will be seen that when the speed begins to perturbate due to changes in angular acceleration, the spark timing is delayed and as a result the acceleration and engagement of the clutch is smooth. After the clutch is engaged, then the system returns to normal operation and the desired results of the invention are achieved.

Thus, from the foregoing description it should be readily apparent that the described embodiment very effectively controls engine acceleration during the time when the clutch is being engaged to avoid chattering of the clutch engagement and other difficulties with the transmission. This has been done by delaying the spark timing but it also should be readily apparent that other ways of controlling the engine power output during this time to reduce acceleration variations can be employed such as cylinder skipping or misfiring of a single cylinder. Of course, the foregoing description is that of preferred forms of the invention and various changes and modifications can be made without departing from the spirit and scope of the invention, as defined by the appended claims.

The invention claimed is:

1. A vehicle transmission system protection by engine control method for a vehicle in which rotation of an internal combustion engine is transmitted to a driven wheel through a transmission system, said method comprising the steps of detecting during engine acceleration variations in the rotational state of a shaft, determining if the degree of change in rotational state variation is excessive and will cause difficulties in the transmission system, and restricting engine output if the degree of change in rotational state of a shaft is excessive.

2. A vehicle transmission system protection by engine control method for a vehicle as set forth in claim 1 wherein the degree of change in rotational state of the engine rotational state is determined by measuring shaft speed on successive rotations.

3. A vehicle transmission system protection by engine control method for a vehicle as set forth in claim 1 wherein the degree of change in rotational state of the engine rotational state is determined by measuring shaft speed during a portion of shaft rotation during successive cycles.

4. A vehicle transmission system protection by engine control method for a vehicle as set forth in claim 3 wherein the successive cycles are a compression cycle and an exhaust cycle in a four cycle engine.

5. A vehicle transmission system protection by engine control method for a vehicle as set forth in claim 1 wherein the degree of change in rotational state of the engine rotational state is both degree of rotational variation and rotational acceleration.

6. A vehicle transmission system protection by engine control method for a vehicle as set forth in claim 1 wherein the degree of change in rotational state of the engine rotational state is determined by measuring the time interval during a fixed degree of shaft rotation and for a complete rotation including the measured fixed degree of shaft rotation.

7. A vehicle transmission system protection by engine control method for a vehicle claim 1 wherein the engine output is varied by changing the spark timing.

8. A vehicle transmission system protection by engine control method for a small vehicle as set forth in claim 7, wherein spark timing is changed by a time set in a timer.

9. A vehicle transmission system protection by engine control method for a small vehicle according to claim 7, wherein the change of spark timing is feedback controlled such that acceleration of engine revolution will not exceed a set value.

10. A vehicle transmission system protection by engine control method for a vehicle as set forth in claim 1 wherein the transmission system is comprised of a clutch and a transmission and the avoided undesirable transmission system condition is clutch chattering.

11. A vehicle comprised of an internal combustion engine, a transmission system driven by said engine, a driven wheel driven by said transmission system and an engine control for detecting during engine acceleration variations in the rotational state of a shaft, determining if the degree of change in rotational state variation is excessive and will cause difficulties in the transmission system, and restricting engine output if the degree of change in rotational state of said shaft is excessive.

12. A vehicle as set forth in claim 11 wherein the transmission system comprised of a clutch and a transmission and the avoided undesirable transmission system condition is clutch chattering.

13. A vehicle as set forth in claim 12 wherein the engine control determines the degree of change in rotational state of the engine rotational state by measuring shaft speed on successive rotations.

14. A vehicle as set forth in claim 12 wherein the engine control determines the degree of change in rotational state of the engine rotational state by measuring shaft speed during a portion of shaft rotation during successive cycles.

15. A vehicle as set forth in claim 14 wherein the successive cycles are a compression cycle and an exhaust cycle in a four cycle engine.

16. A vehicle as set forth in claim 12 wherein the engine control determines the degree of change in rotational state of the engine rotational state is both degree of rotational variation and rotational acceleration.

17. A vehicle as set forth in claim 12 wherein the engine control determines the degree of change in rotational state of the engine rotational state by measuring the time interval during a fixed degree of shaft rotation and for a complete rotation including the measured fixed degree of shaft rotation.

18. A vehicle as set forth in claim 17 wherein the engine output is varied by changing the spark timing.

19. A vehicle as set forth in claim 18 wherein the spark timing is changed by a time set in a timer.

20. A vehicle as set forth in claim 18 wherein the spark timing is feedback controlled such that acceleration of engine revolution will not exceed a set value.

* * * * *